United States Patent [19]

Mondie

[11] Patent Number: 5,659,396

[45] Date of Patent: Aug. 19, 1997

[54] DICHOTOMOUS SCAN SYSTEM FOR DETECTION OF EDGES OF OBJECTS AND OVERLAPPED OBJECTS HAVING RELATIVELY UNIFORM SURFACES

[75] Inventor: George Randolph Mondie, Bedford, Tex.

[73] Assignee: ElectroCom Automation L.P., Arlington, Tex.

[21] Appl. No.: 482,827

[22] Filed: Jun. 7, 1995

[51] Int. Cl.$^6$ .................................. G01B 11/06
[52] U.S. Cl. ............... 356/381; 356/384; 250/223 R; 250/559.36
[58] Field of Search ................. 356/381, 382, 356/372, 375, 384–387, 429–431; 250/223 R, 559.19, 559.21, 559.24, 559.26, 559.27, 559.28, 559.29, 559.36

[56] References Cited

U.S. PATENT DOCUMENTS

| | | |
|---|---|---|
| 3,278,754 | 10/1966 | Wallace . |
| 3,283,163 | 11/1966 | Folmar . |
| 3,414,732 | 12/1968 | Stegena . |
| 3,614,419 | 10/1971 | Daughton .............................. 250/223 R |
| 3,737,666 | 6/1973 | Dutro ..................................... 250/223 R |
| 3,822,946 | 7/1974 | Rynkowski .............................. 356/387 |
| 3,892,492 | 7/1975 | Eichenberger . |
| 4,063,820 | 12/1977 | Borgese ................................... 356/372 |
| 4,112,309 | 9/1978 | Nakazawa et al. .................. 250/559.24 |
| 4,217,491 | 8/1980 | Dufford et al. ...................... 250/223 R |
| 4,286,149 | 8/1981 | Ben-Nathan et al. ............... 250/223 R |
| 4,481,667 | 11/1984 | Price et al. ............................. 250/223 R |
| 4,679,941 | 7/1987 | Fujita ........................................ 356/384 |
| 5,013,927 | 5/1991 | Tsikos et al. ............................ 356/376 |
| 5,351,126 | 9/1994 | Takada et al. ........................... 356/381 |
| 5,373,363 | 12/1994 | Kobayashi ........................... 250/559.26 |

OTHER PUBLICATIONS

Article: *Technical Disclosure Bulletin*, vol. 6, No. 10 (Mar. 1964).

*Primary Examiner*—Hoa Q. Pham
*Attorney, Agent, or Firm*—Harold E. Meier

[57] ABSTRACT

Apparatus and method for detection of leading and trailing edges of objects moving along a defined path. A light radiation source directs a light beam toward a beamspot on the path. Light reflected from the beamspot is received by two light sensors. An edge of an object moving along the defined path substantially blocks the light from being received by one light sensor. Circuitry is provided for distinguishing the difference in reflected light received at each light sensor and determining whether the leading edge or trailing edge of the object is blocking the reflected light. Length of detections (leading and trailing edges) and time interval between the detections of the leading and trailing edge are processed to provide information about the object such as height of the leading and trailing edges of the object and length of the object. Further processing of leading and trailing edge detections can detect overlapped objects having relatively uniform surfaces.

17 Claims, 4 Drawing Sheets

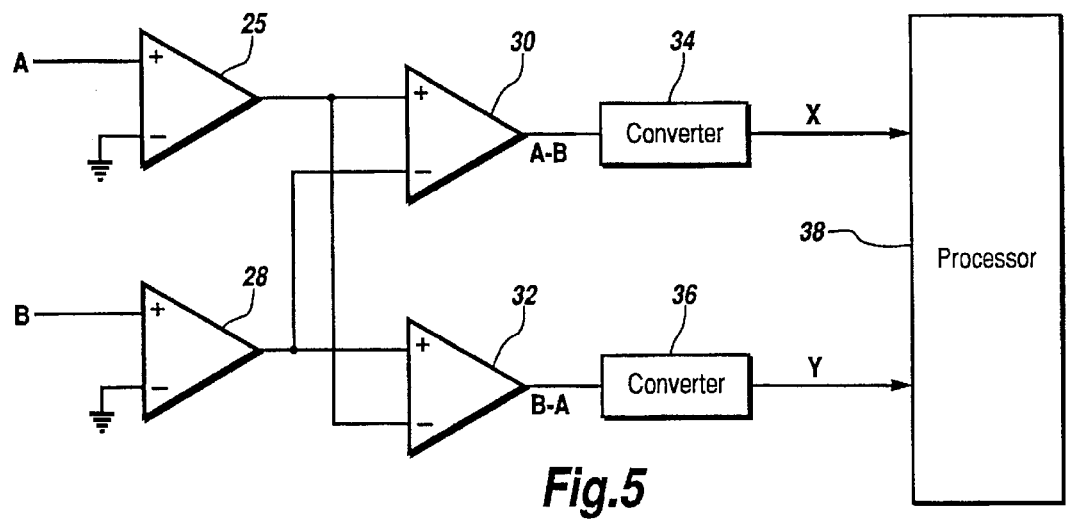
Fig.5
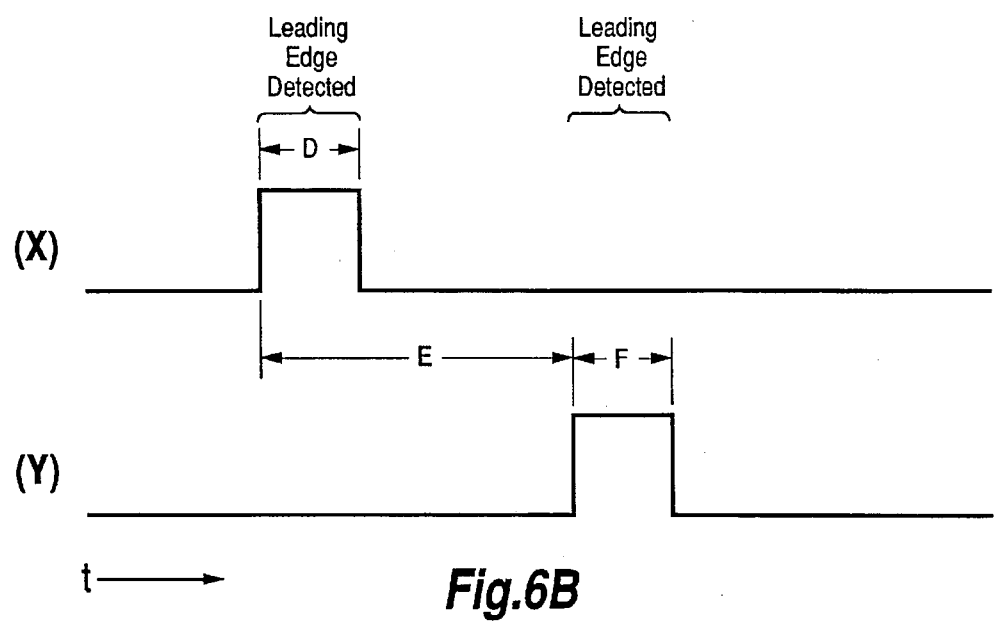
Fig.6A
Fig.6B

DICHOTOMOUS SCAN SYSTEM FOR DETECTION OF EDGES OF OBJECTS AND OVERLAPPED OBJECTS HAVING RELATIVELY UNIFORM SURFACES

TECHNICAL FIELD

The present invention relates to object detectors and, in particular, to an edge detector for detecting the edges of an object, and further, to an overlapped object detector for detecting an object overlapping another object.

BACKGROUND OF THE INVENTION

Many processes involve the transport of quantities of items in a conveying system. In some of these processes, it is useful to locate and measure physical edges on items. Once an edge has been detected and its sense (rising or falling) and height are determined, this detailed information can be interpreted to determine item or feature presence and position, the existence of overlayed or overlapped objects (such as labels or multiple items) and other feature information relevant to any particular application.

In applications involving the transport of quantities of items, there are advantages in having a low-cost detector capable of resolving edges down to or less than the thickness of a label or a piece of paper, determining the sense of the edge, and determining the height of that edge. Furthermore, there is a need for such capabilities in systems that handle tens of thousands of items per hour in a single stream.

Currently, simple detection systems for the detection of objects moving along a defined path are generally employed for counting the number of objects moving past a point on the path. This technology is suitable for counting "shingled" items (such as newspapers) on a conveyor. The detection method or apparatus typically provides for the illumination of the surfaces of the objects by one or more radiation sources. One or more light detection sensors are utilized for receiving the radiation reflected from these surfaces. A counting condition (for counting the number of objects) is detected when there is a decrease in the amount of light received by the light detection sensor or sensors.

The problem with the present object detection systems, however, is the failure to identify and distinguish between leading and trailing (or rising or falling) edges of an object as it passes the detection station. Current systems only provide a detection signal when the amount of reflected light detected at one sensor is different from the amount of reflected light detected at another sensor. Such systems do not provide a means for determining whether the edge of the object detected was either the leading edge or the trailing edge. Further, these systems do not provide a means for determining the height (thickness) of an edge. Accordingly, there is a need for an object edge detector capable of providing limited three-dimensional geometrical information of the detected object for distinguishing between leading and trailing edges of the object and for providing information about the geometry of the detected object.

At present, detectors capable of identifying, locating and measuring features such as edges either lack the ability to resolve very small features (e.g. acoustic or laser ranging); require elaborate lighting, large computational resources, or substantial time to develop a result (e.g. high-resolution imaging systems); or provide limited information (e.g. devices which measure thickness using light curtains and mechanical or opto-electronic item counters). No existing system capable of detecting edge presence, sense, and height combines the characteristics of low cost, high resolution, modest computational resources, and high speed.

In particular, there exists a need in the processing of mail and other documents to identify overlapped items, address windows and labels, and stamps. Further, there exists a need to employ a plurality of detectors to provide additional feature information on one or both sides of items transported in mail handling and other systems that transport quantities of materials. Such applications include the detection of multiples, improved optical character recognition (OCR) read rates (which depend on address block location—often associated with a window or label), and locating and/or verifying the presence of stamps or other features. Additionally, there is a need for an object detector capable of identifying overlapping objects having relatively uniform, flat surfaces.

Typical mail processing systems handle ten or more pieces of mail per second in a single stream. However, given presently available technology, their cost would be increased greatly by the addition of vision systems capable of the required resolution and throughput. Nor would the information provided by a simple edge detector (with no sense or thickness information) suffice to accurately distinguish features such as labels, windows, stamps, and envelope folds. Accordingly a novel approach to edge and feature detection is required to solve problems which currently exist in the handling of mail, other documents, and other materials with three dimensional surface features.

SUMMARY OF THE INVENTION

According to the present invention, an electro-optical edge detector and method for detecting and differentiating between leading and trailing edges of an object moving along a defined path is provided. The electro-optical edge detector comprises a radiation source emitting radiation directed toward a spot on the path and a first and second radiation sensor positioned and directed toward the spot to each receive radiation reflected from the radiated radiation spot or object positioned between the radiation source and the spot. The first and second radiation sensors generate a first and second output signal, respectively, each having a magnitude in relation to the amount of reflected radiation received by the first and second radiation sensors. An edge of the object substantially blocks the radiation reflected from the spot to either the first or second radiation sensors whereby a means for receiving the first and second output signals from the radiation sensors detects the difference between the first and second output signals to provide a first detection signal when the leading edge of the object is detected and a second detection signal when the trailing edge of the object is detected. In the preferred embodiment, the present invention can also determine the height of such edges on the object. Furthermore, the height of the edge is in proportion to the duration of the first or second detection signal. Because the output signals of the present invention are generated by combining the inputs from two independent sensors, the present invention methodology is referred to as a dichotomous scan.

BRIEF DESCRIPTION OF THE DRAWINGS

A more complete understanding of the edge detector and overlapped object detector of the present invention may be had by reference to the following detailed description in conjunction with the accompanying drawings wherein:

FIG. 5 is a schematic diagram of circuitry for the detector system, the circuitry utilized in detecting the leading and trailing edges of an object;

FIG. 6A is a truth table showing the outputs X and Y of the circuitry of FIG. 5 corresponding to the detection of the leading edge and the trailing edge of an object;

FIG. 6B shows time-referenced waveform outputs X and Y of the circuitry of FIG. 5 corresponding to the detection of an object moving along the defined path;

DETAILED DESCRIPTION

Figure 1:
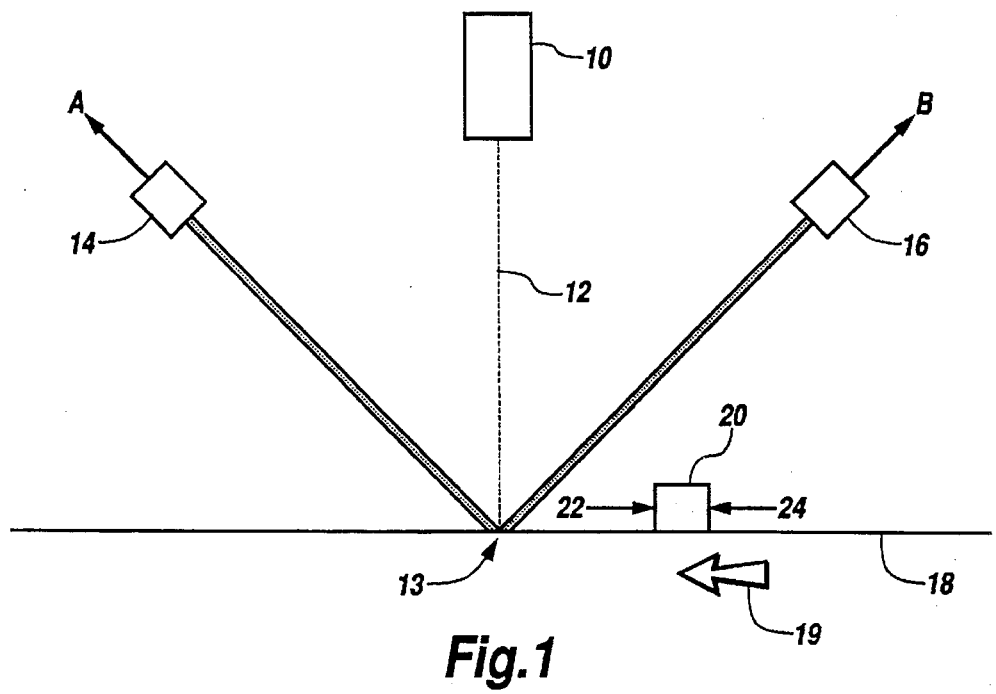
FIG. 1 illustrates a light source and two light sensors of a detector system of the present invention.

Referring now to FIG. 1, there is illustrated a radiation source and sensors of the edge detector according to the present invention. The edge detector comprises a light source 10 outputting a light beam 12 directed toward a beamspot 13 on a defined path 18. An arrow 19 illustrates the direction of travel of an object on the defined path 18. While in the preferred embodiment the source 10 is a light source, the source 10 can also emit other types of radiation to produce the desired results in accordance with the present invention. In the preferred embodiment, light source 10 is a laser diode emitting a collimated laser light beam 12. However, as set forth earlier, the light source 10 can be any device which emits light or radiation. The light beam 12 is directed to the beamspot 13 on the defined path 18. At the beamspot 13, the light beam 12 is reflected from the surface of the defined path 18 more or less equally in all directions.

The edge detector of the present invention also comprises a first light sensor 14 and a second light sensor 16 for receiving the light reflected from the beamspot 13. The first light sensor 14 is positioned aft (or downstream) from the beamspot 13 and oriented to receive light reflected from the beamspot. The second light sensor 16 is positioned forward (or upstream) of the beamspot 13 and also oriented to receive reflected light from the beamspot. While in the preferred embodiment the sensors 14, 16 are light sensors, it will be appreciated that they can also be any type of sensor that senses radiation or light, depending on the type of source 10. Also, in the preferred embodiment, the first and second light sensors 14 and 16 are photodiodes. However any device which senses or detects light or radiation emitted from the light source 10 can be used. The first radiation sensor 14 outputs an output signal A in relation to the amount of reflected light received by the first sensor while the second light sensor 16 outputs an output signal B in relation to the amount of reflected light received by the second sensor.

As illustrated in FIG. 1, an object 20 having a leading edge 22 and a trailing edge 24 travels along the defined path 18 in the direction indicated by the arrow 19. As the object 20 moves along the defined path 18, it will eventually pass through the light beam 12 at the beamspot 13 where both the leading edge 22 and the trailing edge 24 will be detected. With the positioning of the object 20 as shown in FIG. 1, first and second light sensors 14 and 16 each receive about the same amount of reflected light from the beamspot 13.

Referring now to FIG. 5, there is shown a schematic diagram of the circuitry of the detector system of the present invention. Output signal A from the first light sensor 14 is amplified by an amplifier 25 whereby the amplified signal A is input to a first differential amplifier 30 and a second differential amplifier 32. Output signal B from the second light sensor 16 is amplified by an amplifier 28 whereby the amplified signal B is also input to the first and second differential amplifiers 30 and 32, as shown.

The first differential amplifier 30 combines the amplified signals A and B output from the first and second light sensors 14 and 16 to produce a positive level output when the amount of reflected light received at the first light sensor 14 is significantly greater than the amount of reflected light received at the second light sensor 16. The amplifier 30 produces a near zero level output when the amount of reflected light received at the first light sensor 14 is about equal to the amount of reflected light received at the second light sensor 16. A negative level output is produced by the amplifier 30 when the amount of reflected light received at the first light sensor 14 is significantly less than the amount of reflected light received at the second light sensor 16.

The output of the first differential amplifier 30 is defined as signal A minus signal B. This output is then converted to a digital signal by a converter 34 and output as signal X. As such, signal X is a logic "1" when the amount of reflected light received at the first light sensor 14 is significantly greater than the amount of reflected light received at the second light sensor 16, otherwise, signal X=logic "0".

The second differential amplifier 32 combines the amplified signals A and B output from the first and second light sensors 14 and 16 to produce a positive level output when the amount of reflected light received at the second light sensor 16 is significantly greater than the amount of reflected light received at the first light sensor 14. The amplifier 32 produces a near zero level output when the amount of reflected light received at the second light sensor 16 is about equal to the amount of reflected light received at the first light sensor 14. A negative level output is produced by the amplifier 32 when the amount of reflected light received at the second light sensor 16 is significantly less than the amount of reflected light received at the first light sensor 14.

The output of the second differential amplifier 32 is defined as signal B minus signal A. This output is then converted to a digital signal by a converter 36 and output as signal Y. As such, signal Y is a logic "1" when the amount of reflected light received at the second light sensor 16 is significantly greater than the amount of reflected light received at the first light sensor 14, otherwise, signal Y=logic "0".

Figure 2:
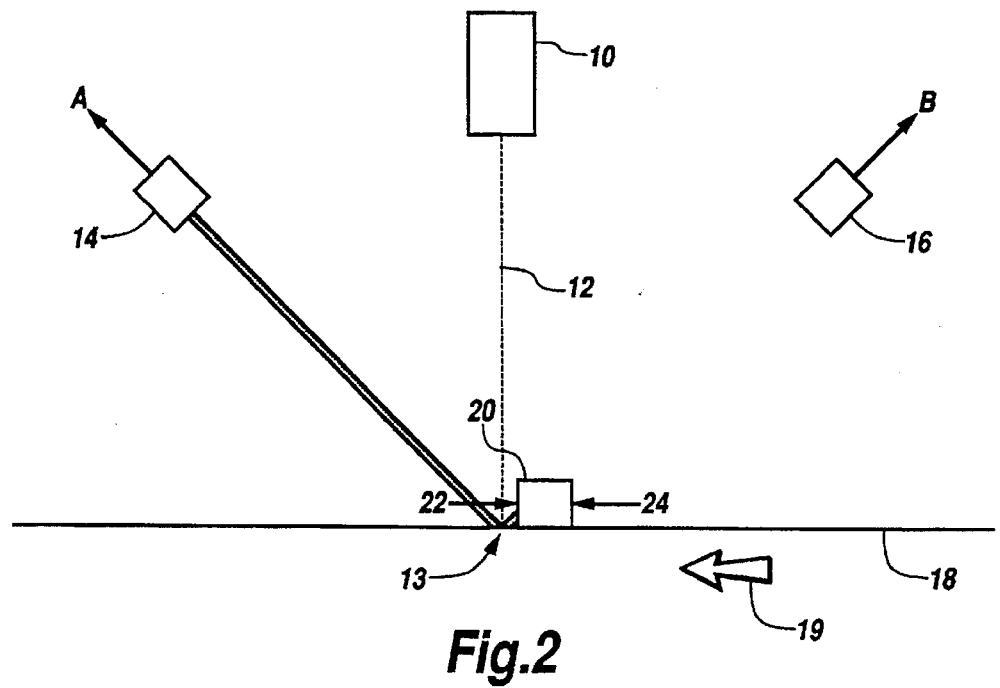
FIG. 2 illustrates the detection of the leading edge of an object moving along a defined path.

Now referring to FIG. 2, the object 20 upstream from the beamspot 13 is shown moving along the defined path 18. As the object 20 moves closer to the beamspot 13, the leading edge 22 of the object 20 substantially blocks and prevents light reflected from the beamspot 13 from reaching the second light sensor 16. Accordingly, the amount of reflected light received by first light sensor 14 is significantly greater than the amount of reflected light received by second light sensor 16, resulting in signal X =logic "1" and signal Y=logic "0".

Figure 3:
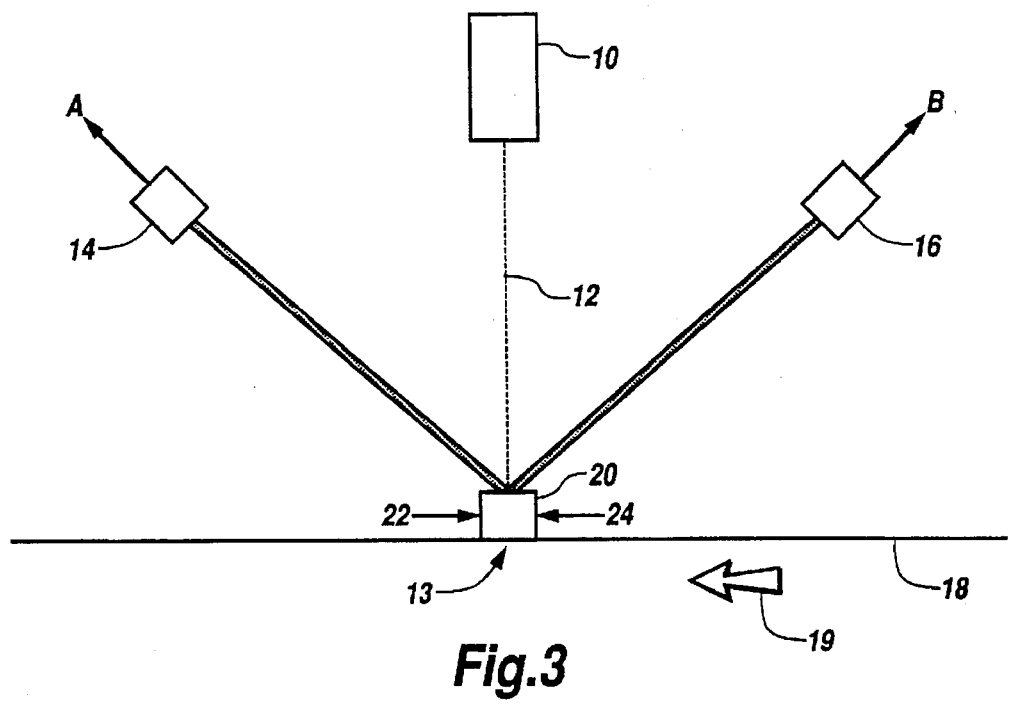
FIG. 3 illustrates the reflection of the light from the top surface of an object moving along the defined path.

Referring now to FIG. 3, the leading edge 22 of the object 20 has now moved past the beamspot 13. The light beam 12 is now reflected from the top surface of the object 20. With the object 20 in this position, the top surface reflects the light beam 12 more or less equally in all directions. As such, the amount of reflected light received at each of the first and second light sensors 14, 16 is about equal. As such, signals X and Y=logic "0".

Figure 4:
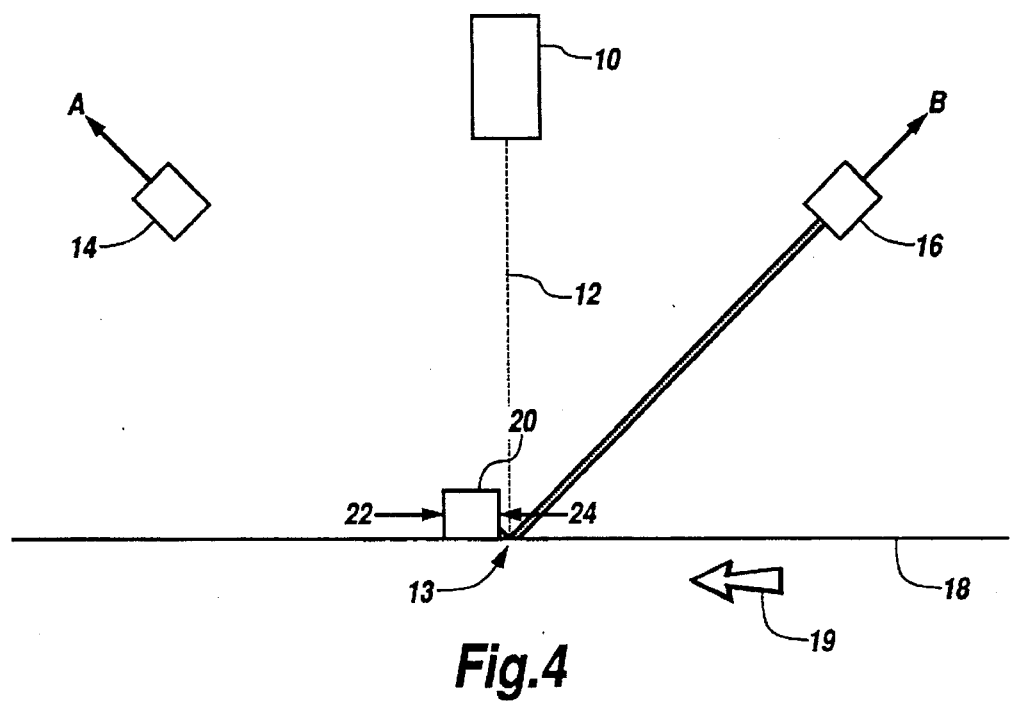
FIG. 4 illustrates the detection of the trailing edge of an object moving along the defined path.

Referring now to FIG. 4, the object 20 is shown along the defined path 18 with the trailing edge 24 now past the beamspot 13. The trailing edge 24 of the object 20 substantially blocks and prevents light reflected from the beamspot 13 from reaching the first light sensor 14. Accordingly, the amount of reflected light received by the second light sensor 16 is significantly greater than the amount of reflected light received by the first light sensor 14, resulting in signal Y=logic "1" and signal X =logic "0".

With reference to FIG. 6A, there is shown a truth table indicating the values of signals X and Y corresponding to the detection of an edge of an object as it moves along the defined path 18. When signal X=logic "1", the leading edge of an object has been detected. Conversely, when signal Y=logic "1", the trailing edge of the object has been detected. When both signals X and Y =logic "0" no edge is being detected.

FIG. 6B illustrates the time-referenced waveforms of signals X and Y as the object 20 moves along the defined path 18 whereby both the leading edge 22 and trailing edge 24 have sequentially been detected. The duration D of signal X indicating the detection of a leading edge is directly proportional to the height of the leading edge 22 of the object 20 and the object velocity. Given the velocity of the object 20 moving along the defined path 18, the angle at which the first light sensor 14 is directed toward the beamspot 13 and the duration D of signal X, a processor 38 (shown in FIG. 5) can determine from the signal X the height of the leading edge 22 of the object 20. Likewise, the duration F of signal Y detecting the trailing edge 24 of the object 20 can also be used to determine from the signal Y the height of the trailing edge 24 of the object 20. Additionally, the length of the object 20 can also be determined from the time interval E between the transitions to logic "1" level of signals X and Y. The length of the object 20 is equal to the velocity of the object multiplied by the time interval E between the signals. X and Y changing logic levels. It will be understood that many types of processors may be utilized to determine from the logic levels of signals X and Y the height of the leading and trailing edges and the length of the object.

Figure 7:
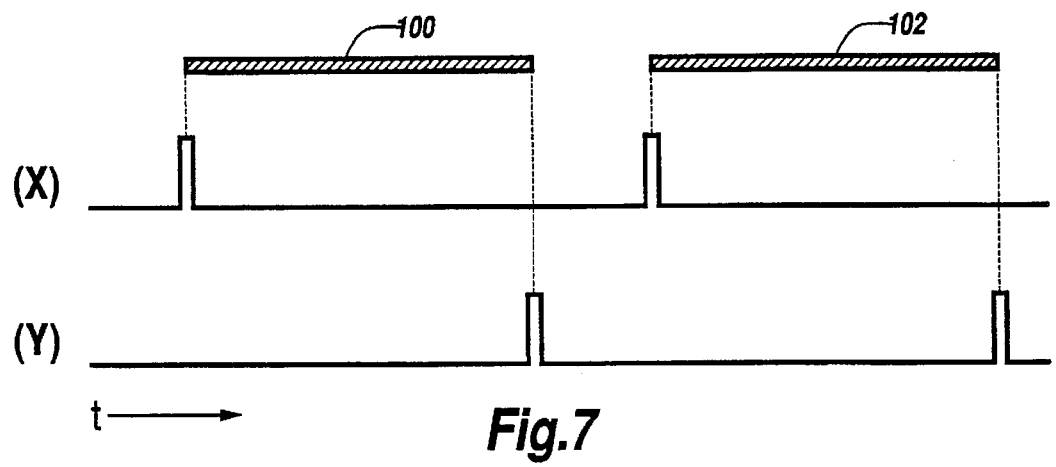
FIG. 7 shows waveform outputs X and Y of the circuitry of FIG. 5 in relation to two objects as the objects would be detected moving along the defined path.
Figure 8:
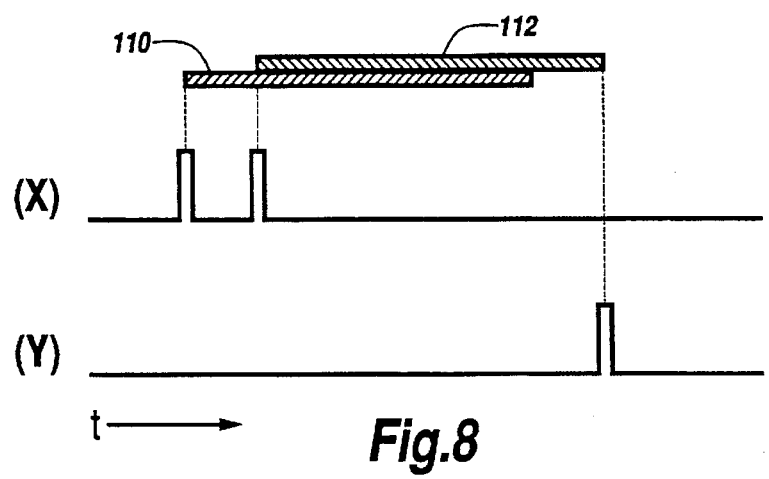
FIG. 8 shows waveform outputs X and Y of the circuitry of FIG. 5 in relation to one configuration of overlapping objects as the overlapping objects would be detected moving along the defined path.
Figure 9:
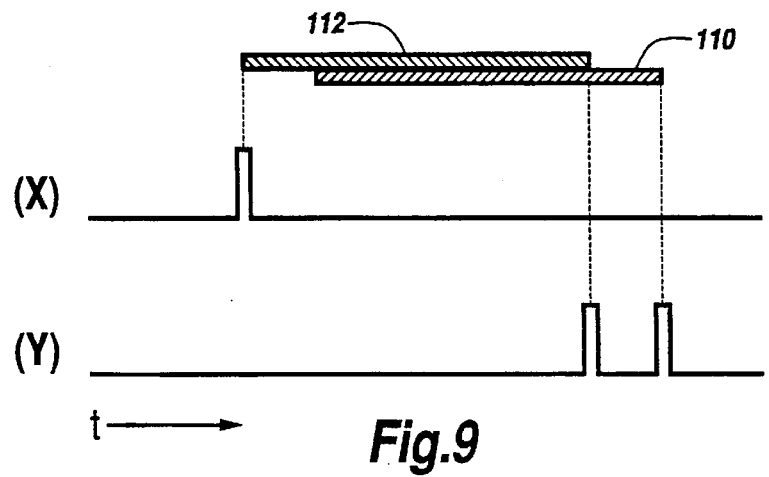
FIG. 9 shows waveform outputs X and Y of the circuitry of FIG. 5 in relation to a second configuration of overlapping objects as the overlapping objects would be detected moving along the defined path.

While the preceding description of the present invention illustrated the detection of leading and trailing edges of a single object moving along the defined path, the present invention can also detect the presence of overlapping objects. Referring now to FIG. 7, there is illustrated waveforms of signal X and signal Y in relation to the detection of a first object 100 and a second object 102 as if the objects were detected while moving along the defined path. Referring now to FIG. 8, there are shown waveforms of signal X and signal Y in relation to the detection of an underlying object 110 and an overlapping object 112. Referring now to FIG. 9, there are illustrated waveforms of signal X and signal Y in relation to the detection of another configuration of the underlying object 110 and the overlapping object 112.

As will be appreciated by the waveforms of signal X and signal Y shown in FIGS. 7, 8 and 9, an overlapping object can be detected by post-processing of signal X and signal Y by the processor 38 (shown in FIG. 5). It will be understood that different techniques or methods (including either hardware or software) may be used for processing the signals X and Y for detection of an overlapping condition. Further, this processing may also include other variables, such as object edge height and object length, that may be used for proper identification or classification of superimposed overlapping objects.

Although several embodiments of the present invention have been described in the foregoing detailed description and illustrated in the accompanying drawings, it will be understood by those skilled in the art that the invention is not limited to the embodiments disclosed but is capable of numerous rearrangement, substitutions and modifications without departing from the spirit of the invention.

What is claimed is:

1. An electro-optical edge detector for detecting leading and trailing edges of an object moving along a defined path, comprising:

a radiation source emitting radiation directed toward a spot on the path;

a first radiation sensor positioned to receive radiation reflected from the spot, movement of the object along the defined path causes the trailing edge of the object to substantially block radiation reflected from the spot to said first radiation sensor, said first radiation sensor generating a first output signal;

a second radiation sensor positioned to receive radiation reflected from the spot, movement of the object along the defined path causes the leading edge of the object to substantially block radiation reflected from the spot to said second radiation sensor, said second radiation sensor generating a second output signal; and a detector comprising a first amplifier receiving the first output signal and the second output signal and generating a leading edge signal when the magnitude of the first output signal exceeds the magnitude of the second output signal identifying the leading edge of the object, and a second amplifier receiving the first output signal and the second output signal and generating a trailing edge signal when the magnitude of the second output signal exceeds the magnitude of the first output signal identifying the trailing edge of the object.

2. An electro-optical edge detector in accordance with claim 1 wherein the radiation source comprises a light emitting diode emitting a collimated light beam.

3. An electro-optical edge detector in accordance with claim 1 wherein the first and second radiation sensors each comprise a photodiode.

4. An electro-optical edge detector in accordance with claim 1 wherein the detector further comprises a first converter and a second converter for respectively converting the leading edge and trailing edge signals generated by the first and second amplifiers into digital logic signals.

5. An electro-optical edge detector in accordance with claim 1 wherein the detector includes means for activating the leading edge signal for a first time interval, said first time interval dependent on a height of the leading edge and velocity of the object, and means for activating the trailing edge signal for a second time interval, said second time interval dependent on a height of the trailing edge and velocity of the object.

6. An electro-optical edge detector in accordance with claim 5 wherein the detector includes means for determining a time interval between the activation of the leading edge signal and the activation of the trailing edge signal, the time interval dependent on the velocity of the object and on a length of the object in the direction of movement.

7. An electro-optical edge detector in accordance with claim 1 wherein the detector further comprises means for determining the height of the leading and trailing edges of the object and the length of the object along the direction of movement of the object along the path.

8. An electro-optical edge detector for detecting leading and trailing edges of an object moving in a given direction along a defined path, comprising:

a light source emitting a collimated light beam directed toward a spot on the defined path;

a first light sensor positioned on the downstream side of the spot and directed toward the spot to receive light reflected from the spot whereby the reflected light will be substantially blocked by the trailing edge of the object moving along the path, said first light sensor generating a first output signal;

a second light sensor positioned on the upstream side of the spot and directed toward the spot to receive light reflected from the spot whereby the reflected light will be substantially blocked by the leading edge of the object moving along the path, said second light sensor generating a second output signal; and a detector comprising a first amplifier and a second amplifier, said first amplifier receiving the first output signal and the second output signal and generating a leading edge signal when the magnitude of the first output signal exceeds the magnitude of the second output signal identifying the leading edge of the object, and a second amplifier receiving the first output signal and the second output signal and generating a trailing edge signal when the magnitude of the second output signal exceeds the magnitude of the first output signal identifying the trailing edge of the object.

9. A method for detecting leading and trailing edges of an object moving in a given direction along a defined path, comprising the steps of:

directing a beam of light toward a spot on the defined path;

receiving at a first light sensor light reflected from the spot;

receiving at a second light sensor light reflected from the spot;

generating a first output signal and a second output signal in response to light received by said first light sensor and said second light sensor, respectively;

generating a leading edge signal when the magnitude of the first output signal exceeds the magnitude of the second output signal identifying the leading edge of the object; and generating a trailing edge signal when the magnitude of the second output signal exceeds the magnitude of the first output signal identifying the trailing edge of the object.

10. A method in accordance with claim 9 further comprising the step of activating the leading edge signal for a first time interval depending on the height of the leading edge and velocity of the object.

11. A method in accordance with claim 10 further comprising the step of activating the trailing edge signal for a second time interval depending on the height of the trailing edge and velocity of the object.

12. A method in accordance with claim 11 further comprising the step of generating a time interval between the activation of the leading edge signal and the activation of the trailing edge signal, the time interval dependent on the velocity of the object and on a length of the object in the direction of movement.

13. A method for detecting leading and trailing edges of an object moving along a defined path, comprising the steps of:

directing a collimated beam of light toward a spot on the defined path;

receiving light reflected from the spot by a first light sensor positioned on the downstream side of the spot;

generating a first output signal from the first light sensor, the first output signal having a magnitude related to the amount of light received by the first light sensor;

receiving light reflected from the spot by a second light sensor positioned on the upstream side of the spot;

generating a second output signal from the second light sensor, the second output signal having a magnitude related to the amount of light received by said second light sensor;

generating a leading edge signal when the magnitude of the first output signal exceeds the magnitude of the second output signal identifying the leading edge of the object; and generating a trailing edge signal when the magnitude of the second output signal exceeds the magnitude of the first output signal identifying the trailing edge of the object.

14. An electro-optical detector for detecting a plurality of dimensions of an object moving along a defined path at a predetermined velocity, comprising:

a radiation source emitting radiation directed toward a spot on the path;

a first radiation sensor positioned to receive radiation reflected from the spot, movement of the object along the defined path causes a trailing edge of the object to substantially block radiation reflected from the spot to said first radiation sensor, said first radiation sensor generating a first output signal;

a second radiation sensor positioned to receive radiation reflected from the spot, movement of the object along the defined path causes a leading edge of the object to substantially block radiation reflected from the spot to said second radiation sensor, said second radiation sensor generating a second output signal;

a detector comprising a first amplifier receiving the first output signal and the second output signal and generating a leading edge signal when the magnitude of the first output signal exceeds the magnitude of the second output signal identifying the leading edge of the object, and a second amplifier receiving the first output signal and the second output signal and generating a trailing edge signal when the magnitude of the second output signal exceeds the magnitude of the first output signal identifying the trailing edge of the object;

means for activating the leading edge signal for a first time interval, said first time interval dependent on a height of the leading edge and velocity of the object, and means for activating the trailing edge signal for a second time interval, said second time interval dependent on a height of the trailing edge and velocity of the object; and means for determining the height of the leading and trailing edges of the object.

15. The electro-optical detector in accordance with claim 14 wherein the detector further includes:

means for determining a time interval between the activation of the leading edge signal and the activation of the trailing edge signal, the time interval dependent on the velocity of the object and on a length of the object in the direction of movement; and means for determining the length of the object along the direction of movement of the object along the path.

16. A method for detecting a plurality of dimensions of an object moving along a defined path at a predetermined velocity, comprising the steps of:

directing a beam of light toward a spot on the defined path;

receiving at a first light sensor light reflected from the spot;

receiving at a second light sensor light reflected from the spot;

generating a first output signal and a second output signal in response to light received by said first light sensor and said second light sensor, respectively;

generating a leading edge signal when the magnitude of the first output signal exceeds the magnitude of the second output signal identifying a leading edge of the object;

generating a trailing edge signal when the magnitude of the second output signal exceeds the magnitude of the first output signal identifying a trailing edge of the object;

activating the leading edge signal for a first time interval depending on a height of the leading edge of the object;

activating the trailing edge signal for a second time interval depending on a height of the trailing edge of the object; and determining the height of the leading and trailing edges of the object.

17. The method in accordance with claim 16 further comprising the step of determining a time interval between the activation of the leading edge signal and the activation of the trailing edge signal, the time interval dependent on the velocity of the object and on a length of the object in the direction of movement; and means for determining the length of the object along the direction of movement of the object along the path.

* * * * *